US012373147B2

(12) United States Patent
Kobayakawa

(10) Patent No.: US 12,373,147 B2
(45) Date of Patent: Jul. 29, 2025

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Tomoya Kobayakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/480,424

(22) Filed: Oct. 3, 2023

(65) Prior Publication Data
US 2024/0118846 A1    Apr. 11, 2024

(30) Foreign Application Priority Data

Oct. 6, 2022  (JP) .................................. 2022-161665

(51) Int. Cl.
*G06F 3/12*  (2006.01)
(52) U.S. Cl.
CPC .......... *G06F 3/1229* (2013.01); *G06F 3/1203* (2013.01)

(58) Field of Classification Search
CPC .... G06F 3/1203; G06F 3/1205; G06F 3/1207; G06F 3/1229; G06F 3/1259; G06F 3/126; G06F 3/1268; G06F 3/1275; G06F 3/1282
See application file for complete search history.

(56) References Cited

U.S. PATENT DOCUMENTS

| 2017/0264780 | A1* | 9/2017 | Yokoyama | ......... H04N 1/33384 |
| 2018/0121185 | A1* | 5/2018 | Yoshitomi | ............... G06F 9/445 |
| 2019/0158999 | A1* | 5/2019 | Ilami | .................... H04B 1/3827 |
| 2020/0174724 | A1* | 6/2020 | Yamada | ................ G06F 3/1218 |

FOREIGN PATENT DOCUMENTS

JP    2016527595 A    9/2016

* cited by examiner

*Primary Examiner* — John R Wallace
(74) *Attorney, Agent, or Firm* — Canon U.S.A., Inc. IP Division

(57) ABSTRACT

An information processing apparatus includes a printer driver and an application. The application stores push notification information in a region in a storage unit to which the printer driver is able to refer. In a case where the application is not currently installed in an execution environment of a target account and a display condition for the push notification information is satisfied, the printer driver causes a display unit to display a push notification based on the push notification information.

16 Claims, 16 Drawing Sheets

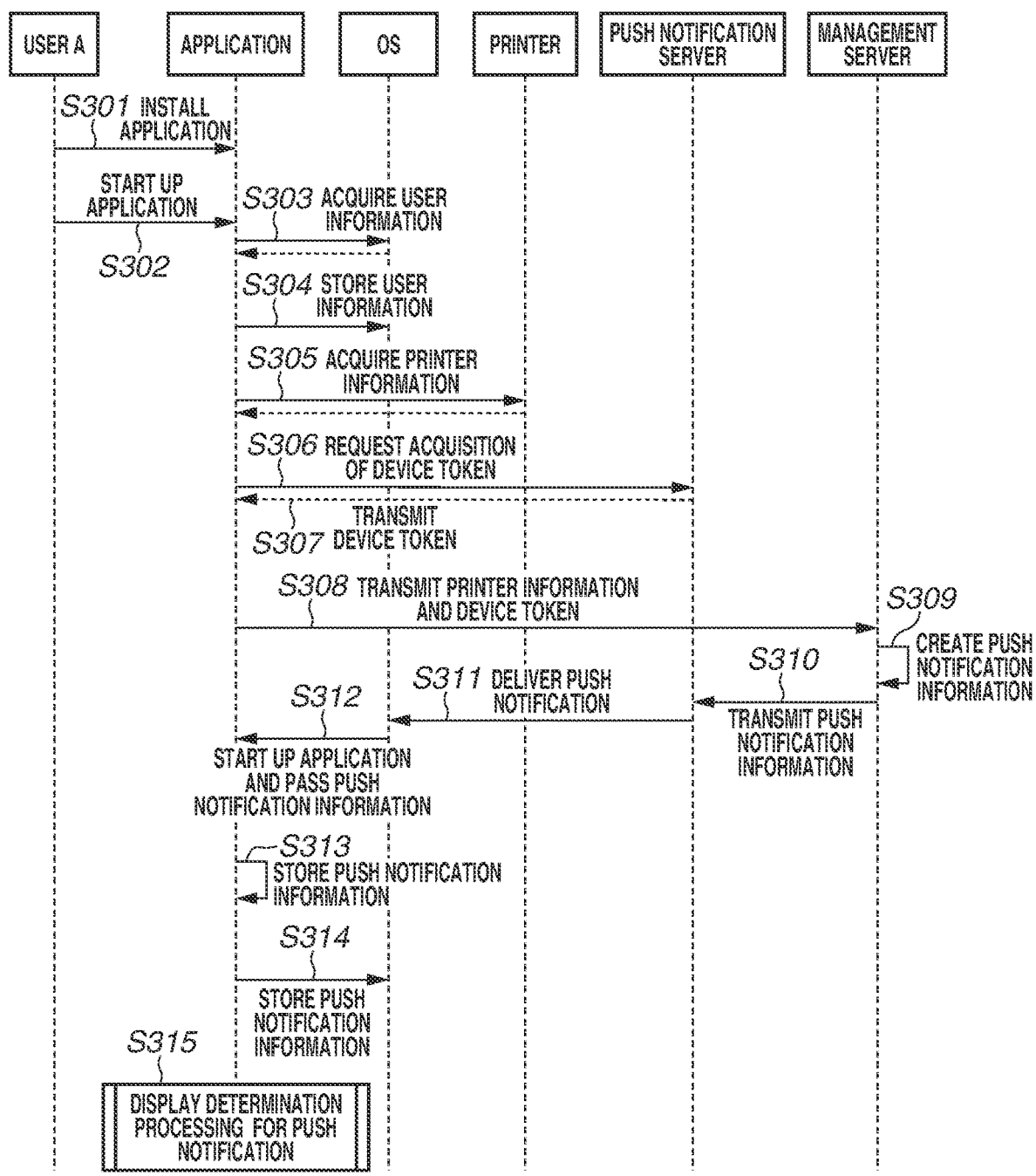

FIG.4

| | | |
|---|---|---|
| MESSAGE: | Why don't you download the application to get a discount coupon for ink! | ~401 |
| DISPLAY URL: | https://www.microsoft.com/store/apps/myappid | ~402 |
| EXPIRATION DATA OF NOTIFICATION: | December 1, 2022, at 0:00 | ~403 |
| DELIVERY TARGET MODEL FOR NOTIFICATION: | ☑ AAA Printer<br>☑ BBB Printer<br>☐ CCC Printer<br>☐ DDD Printer | ~404 |
| DISPLAY CONDITION FOR NOTIFICATION: | · in a case where the user has not yet installed the application<br>· at the time of occurrence of ink remaining amount low warning | ~405 |
| | REGISTRATION | ~406 |

FIG.5

```
{
"message" : "Why don't you download the application to get a discount coupon for ink!",
"campaignURL" : "https://www.microsoft.com/store/apps/myappid",
"expireDate" : "2022¥/12/01 0:00",
"devices" : {
 "12345678",
 "11223344",
 "88776655",
     :
}
"condition" : "NotInstallUser", "Warning:InkLow"
}
```

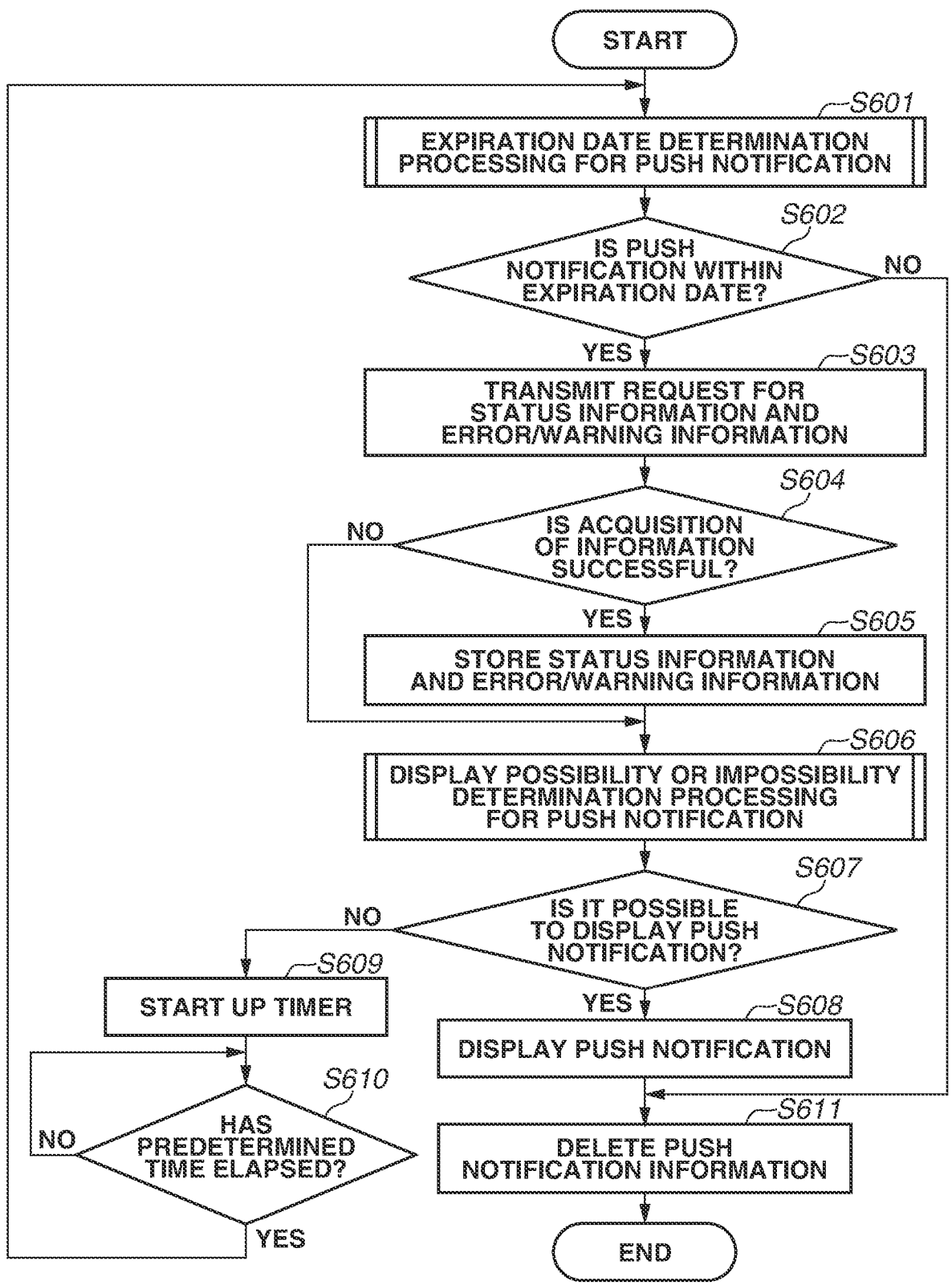

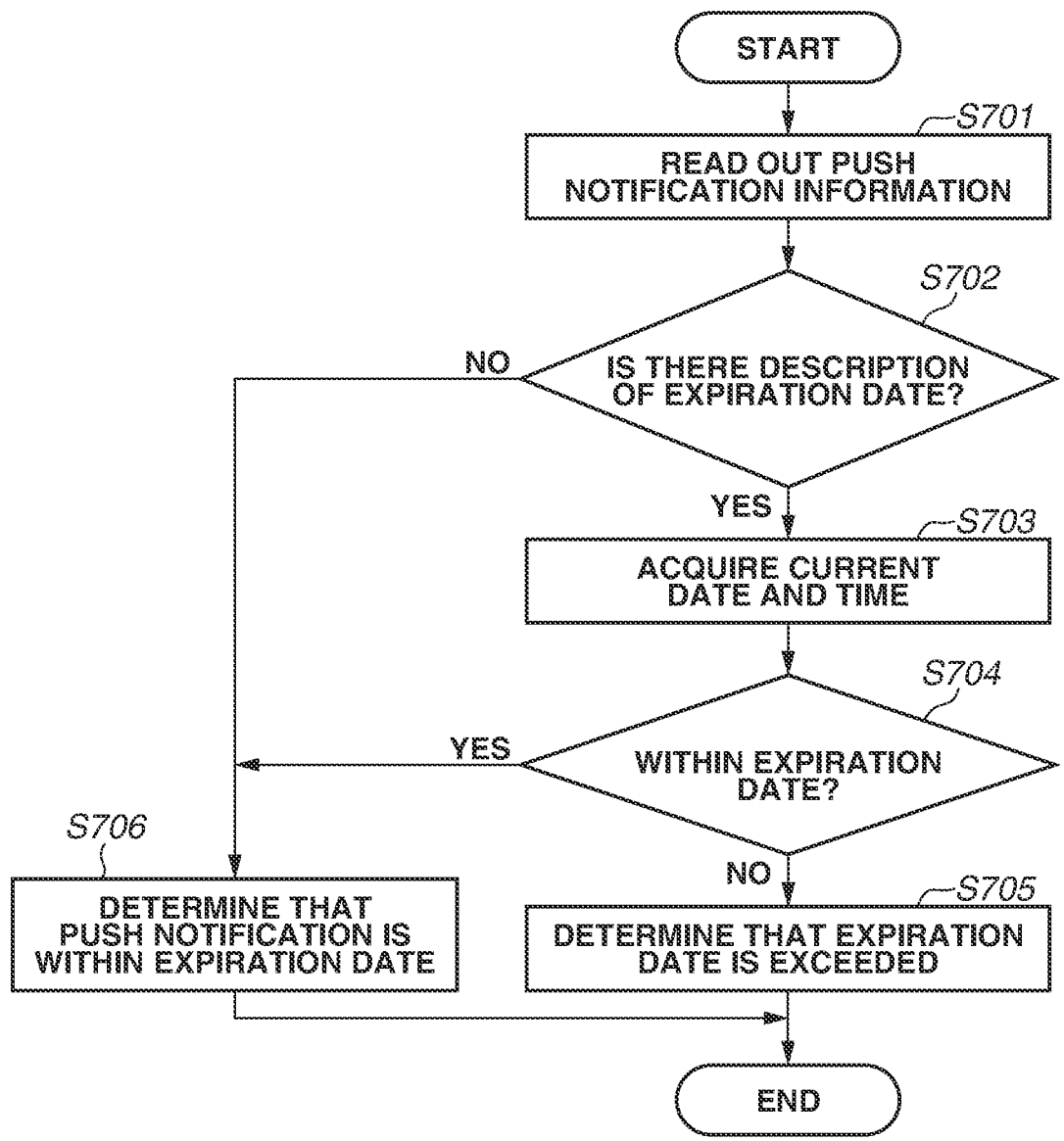

FIG.8A

| STATUS | VALUE |
|---|---|
| WAITING IN PROGRESS | Idle |
| PRINTING IN PROGRESS | Printing |
| INK REPLACEMENT IN PROGRESS | InkChange |

FIG.8B

| ERROR/WARNING | VALUE |
|---|---|
| NONE | None |
| INK REMAINING AMOUNT LOW WARNING | Warning:InkLow |
| PAPER REMAINING AMOUNT LOW WARNING | Warning:PaperLow |
| BATTERY FAILURE ERROR | Error:Battery |

FIG.14

| MESSAGE: | Today only! Printing paper is discounted 10%. | ~1401 |
| --- | --- | --- |
| DISPLAY URL: | https://www.hogehogexxx.com/campaign/index.html | ~1402 |
| EXPIRATION DATA OF NOTIFICATION: | December 1, 2022, at 0:00 | ~1403 |
| DELIVERY TARGET MODEL FOR NOTIFICATION: | ☐ AAA Printer<br>☐ BBB Printer<br>☐ CCC Printer<br>☐ DDD Printer | ~1404 |
| DISPLAY CONDITION FOR NOTIFICATION: | | ~1405 |
| DEGREE OF PRIORITY OF NOTIFICATION: | high | ~1406 |

REGISTRATION ~1407

FIG.15

| MESSAGE: | If you install the application, you can get a great deal of bargain information! Download it now! | ~1501 |
| DISPLAY URL: | https://www.microsoft.com/store/apps/myappid | ~1502 |
| EXPIRATION DATA OF NOTIFICATION: | December 1, 2022, at 0:00 | ~1503 |
| DELIVERY TARGET MODEL FOR NOTIFICATION: | ☐ AAA Printer<br>☐ BBB Printer<br>☐ CCC Printer<br>☐ DDD Printer | ~1504 |
| DISPLAY CONDITION FOR NOTIFICATION: | · in a case where the user has not yet installed the application<br>· in the case of displaying an installation guide for the application | ~1505 |
| DEGREE OF PRIORITY OF NOTIFICATION: | low | ~1506 |

REGISTRATION ~1507

INFORMATION PROCESSING APPARATUS AND CONTROL METHOD FOR INFORMATION PROCESSING APPARATUS

BACKGROUND

Field of the Disclosure

Aspects of the present disclosure generally relate to an information processing apparatus and a control method for an information processing apparatus.

Description of the Related Art

With respect to an application which runs in a terminal device such as a smartphone or a personal computer (PC), there is known a function which issues, from a server to the terminal device, a notification indicating information concerning a service or campaign associated with the application. Furthermore, in the following description, the above-mentioned notification is also referred to as a "push notification". In the terminal device having received the push notification, information concerning the notification is presented to the user, and, in response to an operation such as a click or tap being performed on the information by the user, the particulars of the push notification are presented to the user.

In some cases, to receive a push notification, an application is required to have previously been installed on the terminal device. Nowadays, among target applications, there are many applications which are installed from application stores on networks, and, in such a case, for example, information about the installed application is associated with account information. Japanese Unexamined Patent Application Publication (Translation of PCT Application) No. 2016-527595 discusses a contrivance in which, in a case where, with the above-mentioned mechanism used, a plurality of different devices is used with the same account, an application is caused to be installed on a device on which the application has not yet been installed.

On the other hand, in a case where one information processing apparatus (for example, a terminal device such as a smartphone or a PC) is used with a plurality of accounts, in some cases, an application may be caused to be individually installed with respect to execution environments of the respective accounts. Under such a situation, even if a predetermined application (for example, an application for performing printing) has previously been installed with respect to some of the accounts, there has been no method of notifying users corresponding to the other accounts of the existence of the installed application. Therefore, in such a situation, to use a target application, the users corresponding to the other accounts may be, in some cases, required to actively install the target application.

SUMMARY

Aspects of the present disclosure are generally directed to, even in a condition in which one information processing apparatus is used with a plurality of accounts, enabling issuing a notification of information in a more favorable manner depending on a usage situation of a target application for each account.

According to an aspect of the present disclosure, an information processing apparatus includes a processor; and a storage unit, storing instructions, the processor executing the instructions to function as the following: a driver for a predetermined device; and an application configured to be installed, for each account for a target apparatus, in an execution environment of the account and to run while cooperating with the driver, wherein the storage unit is configured to store notification information serving as a notification target in a region to which the driver is able to refer, and wherein the driver includes a first determination unit configured to determine whether the application is currently installed in an execution environment of a target account, a second determination unit configured to determine whether a notification condition for the notification information stored in the region is satisfied, and a first notification control unit configured to, in a case where it is determined by the first determination unit that the application is not currently installed in the execution environment of the target account and it is determined by the second determination unit that the notification condition for the notification information is satisfied, cause a predetermined notification unit to issue a notification indicating information based on the notification information.

Further features of the present disclosure will become apparent from the following description of exemplary embodiments with reference to the attached drawings.

BRIEF DESCRIPTION OF THE DRAWINGS

FIG. 3 is a sequence diagram illustrating an example of processing which is performed by the information processing system.

FIG. 4 is a diagram illustrating an example of a management screen for a push notification.

FIG. 5 is a diagram illustrating an example of a data structure of push notification information.

FIG. 6 is a flowchart illustrating an example of processing which is performed by an application.

FIG. 7 is a flowchart illustrating an example of processing which is performed by the application.

FIGS. 8A and 8B are diagrams illustrating status information and error/warning information, respectively.

FIG. 14 is a diagram illustrating an example of a management screen for a push notification.

FIG. 15 is a diagram illustrating an example of a management screen for a push notification.

DESCRIPTION OF THE EMBODIMENTS

Figure 1:
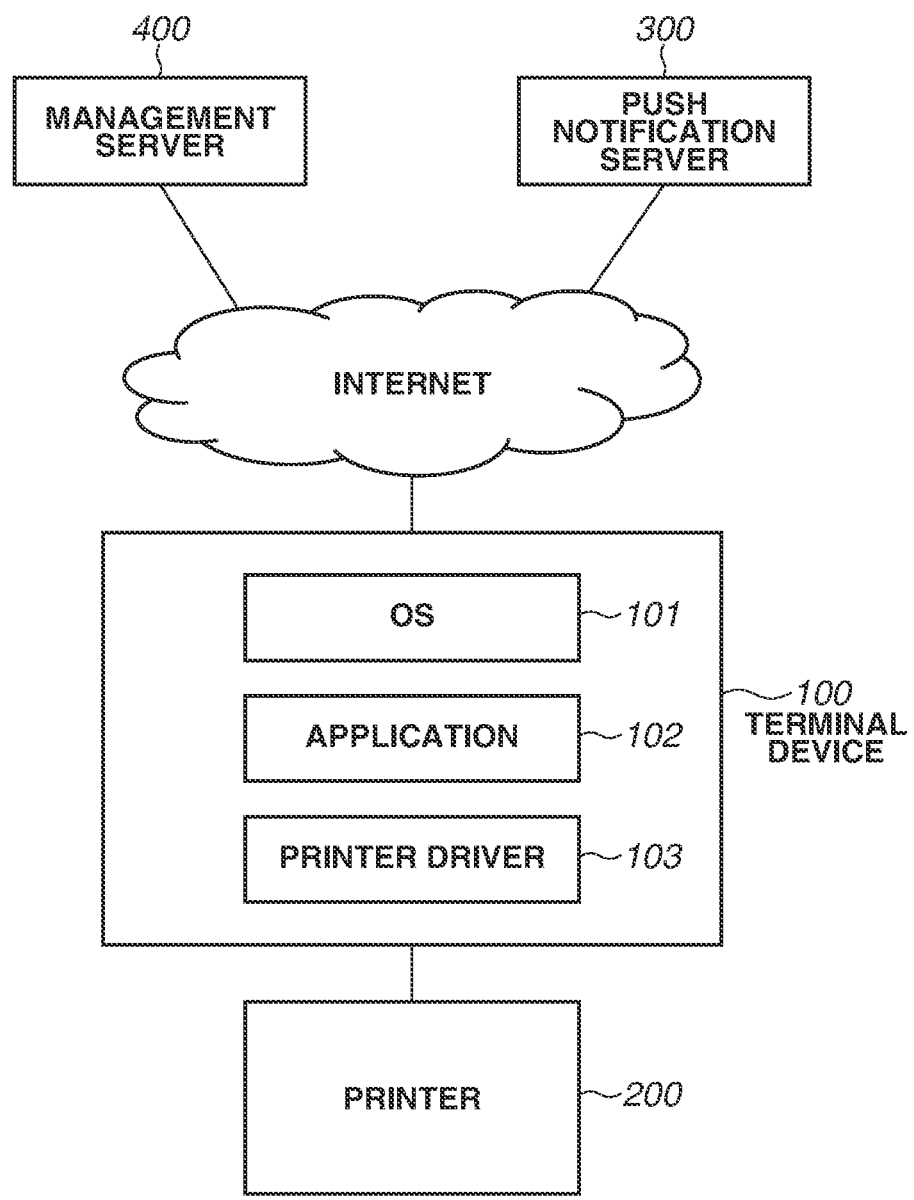
FIG. 1 is a diagram illustrating an example of a system configuration of an information processing system.

Various exemplary embodiments, features, and aspects of the present disclosure will be described in detail below with reference to the drawings.

Furthermore, in the present specification and drawings, constituent elements having substantially the same functional configuration are assigned the same reference characters, and any duplicate description thereof is omitted.

<System Configuration>

An example of a system configuration of an information processing system according to the present exemplary embodiment is described with reference to FIG. 1. The information processing system according to the present exemplary embodiment includes a terminal device (hereinafter also referred to as a "terminal") 100, a printer 200, a push notification server 300, and a management server 400.

The above-mentioned constituent elements of the information processing system are connected via a predetermined network in such a way as to be able to transmit and receive information to and from each other. For example, the terminal device 100 and the printer 200 can be connected via a local area network (LAN) or a Universal Serial Bus (USB) cable in such a way as to be able to communicate with each other. Moreover, the terminal device 100, the push notification server 300, and the management server 400 can be connected via the Internet in such a way as to be able to communicate with each other. Naturally, the above-mentioned configuration is merely an example, and, as long as the constituent elements of the information processing system are able to be connected in such a way as to be able to communicate with each other, the configuration of a network for that purpose is not particularly limited.

The management server 400 schematically represents a server which performs various management operations and various control operations concerning the information processing system according to the present exemplary embodiment. In the present exemplary embodiment, the management server 400 manages what notification to issue to which terminal device.

The push notification server 300 schematically represents a server which issue a push notification to a target terminal device 100 via the network. The push notification server 300 issues a push notification to a designated terminal device 100 based on an instruction issued from the management server 400.

The printer 200 schematically represents a printing apparatus or an image forming apparatus which prints an image of an original on a recording medium such as paper.

The terminal device 100 schematically represents a terminal device such as a tablet terminal or a personal computer (PC).

Furthermore, in the present exemplary embodiment, for the sake of convenience, an operating system (OS) 101, an application 102, and a printer driver 103 are assumed to be currently installed on the terminal device 100.

The OS 101 is basic software which provides an execution environment used for various applications or various drivers to run therein. Furthermore, in the present exemplary embodiment, the application 102 and the printer driver 103 are assumed to run in an execution environment provided by the OS 101.

The printer driver 103 schematically represents what is called a device driver which provides a user interface (UI) and various functions used for the printer 200 to perform printing. Furthermore, in the present exemplary embodiment, for the sake of convenience, the printer driver 103 is assumed to be installed in common with respect to a plurality of accounts registered with the terminal device 100. Thus, in a case where the printer driver 103 has been installed on the terminal device 100, the printer driver 103 is assumed to be able to be also used with respect to an account with respect to which such installation has not been performed.

The application 102 schematically represents a portal application which supports the printer driver 103. The application 102 has the function of, by performing communication with the printer 200 associated with the printer driver 103, not only causing the printer 200 to perform, for example, printing or scanning but also issuing various notifications concerning, for example, the latest solution or good-deal coupon information. Furthermore, the details of the application 102 are separately described below.

<Hardware Configuration>

Figure 2:
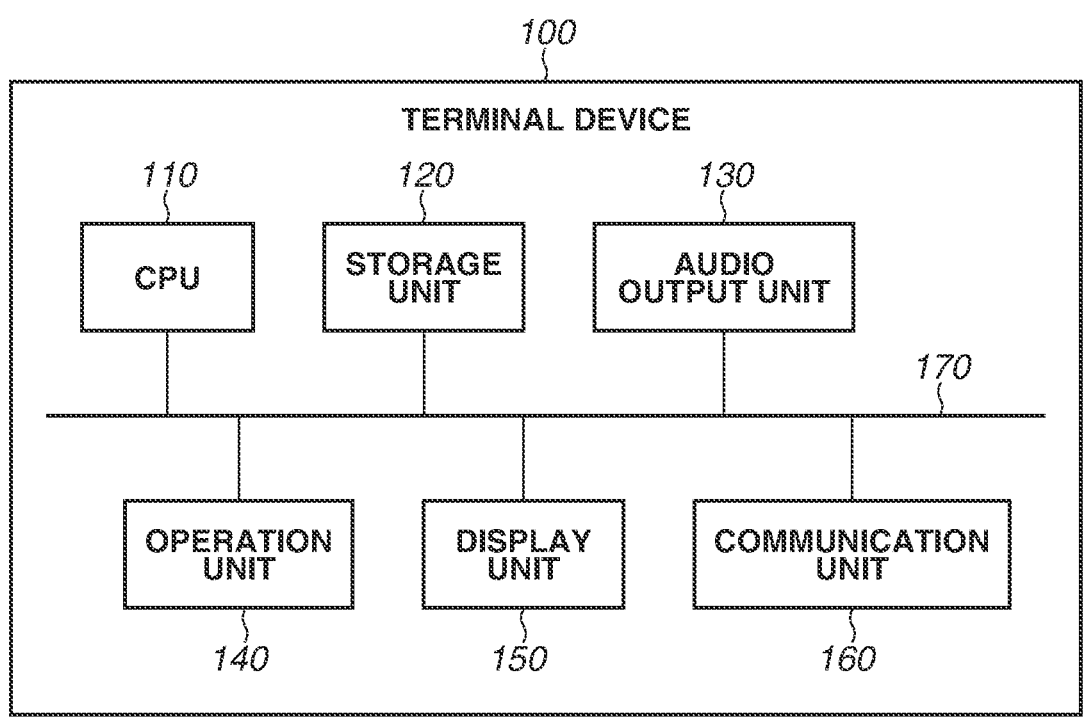
FIG. 2 is a diagram illustrating an example of a hardware configuration of a terminal device.

An example of a hardware configuration of the terminal device 100 is described with reference to FIG. 2. The terminal device 100 includes a central processing unit (CPU) 110, a storage unit 120, an audio output unit 130, an operation unit 140, a display unit 150, and a communication unit 160. The above-mentioned constituent elements of the terminal device 100 are interconnected via a system bus 170 in such a way as to be able to transmit and receive information to and from each other.

The operation unit 140 is implemented with an input device composed of, for example, a mouse, a keyboard, and a touch panel, and receives an operation performed by the user.

The audio output unit 130 is implemented with, for example, a loudspeaker, and outputs sound including, for example, music, sound effects, and voices. For example, the terminal device 100 causes the audio output unit 130 to output a voice indicating information serving as a notification target, thus becoming able to notify the user of the information.

The display unit 150 is implemented with, for example, a liquid crystal display, and displays various images. For example, the terminal device 100 causes the display unit 150 to display an image as information serving as a notification target, thus becoming able to notify the user of the information.

The communication unit 160 is a communication interface used for the terminal device 100 to perform communication with another device. The configuration of the communication unit 160 can be changed as appropriate depending on a transmission path used for communication or a communication method to be applied. As a specific example, the communication unit 160 can be implemented with a wireless LAN interface or a USB interface.

The CPU 110 performs computation or logical determination for various processing operations and controls operations of various constituent elements via the system bus 170.

The storage unit 120 is a storage region for storing various pieces of data and programs or a storage region which is used as, for example, a work area which is used when various programs are executed or a temporary storage region for data. The storage unit 120 is implemented with, for example, a read-only memory (ROM), a random access memory (RAM), or an auxiliary storage device. Programs which are stored in the storage unit 120 include the above-mentioned OS 101, application 102, and printer driver 103.

Furthermore, in the present exemplary embodiment, an example of a case where the application 102 and the printer driver 103, with respect to each of which a program and data are stored in the storage unit 120, cooperate with each other to control an operation of the printer 200 is described. Moreover, processing operations which are separately described below with reference to, for example, FIG. 3, FIG. 6, FIG. 7, FIG. 9 to FIG. 11, and FIG. 16 are implemented with the CPU 110 loading and executing programs of the application 102 and the printer driver 103 stored in the storage unit 120.

<Processing>

An example of processing which is performed by the information processing system according to the present exemplary embodiment is described.

First, an example of processing which is performed by the information processing system in a case where the application 102 has been installed according to an instruction from the user and, then, the application 102 has been started up is described with reference to FIG. 3.

In step S301, when an install program for the application 102 is started up according to an instruction from the user A, the application 102 is installed in an execution environment of an account corresponding to the user A in the terminal device 100.

After the installation of the application 102 is completed, in step S302, when an instruction concerning start-up of the application 102 issued from the user A is received, the application 102 starts up.

In step S303, the application 102 acquires user information about a user serving as a target from the OS 101. The user information is information concerning a user who has installed the application 102, and includes at least an account name associated with the user concerned. In the case of an example illustrated in FIG. 3, user information including at least the account name of the user A is acquired.

In step S304, the application 102 requests the OS 101 to store the user information acquired in step S303 in a region in the storage unit 120 to which the printer driver 103 is able to refer. Furthermore, as the region in the storage unit 120 to which the printer driver 103 is able to refer, for example, a region to which the printer driver 103 is able to refer with all of the user authorities can be applied.

In step S305, the application 102 acquires printer information from the printer 200. The printer information is information concerning a printer serving as a target, and includes, for example, attribute information or identification information about a printer, such as the model name or serial number of a printer. Furthermore, in a case where the application 102 is unable to acquire printer information, such as a case where the printer is in a power-off state, the application 102 can be configured to perform processing in step S306 and subsequent steps on another occasion (for example, on an occasion after printer information is acquired).

In step S306, the application 102 makes, to the push notification server 300, a request for acquiring a device token from the push notification server 300. Furthermore, the application 102 is assumed to preliminarily retain information for accessing the push notification server 300 (for example, address information about the push notification server 300). Moreover, the device token is identification information (ID) which is used for the push notification server 300 to identify a terminal serving as a transmission target for a push notification.

In step S307, the push notification server 300 issues a device token associated with the application 102 according to the request received from the application 102 in step S306, and transmits the device token to the application 102.

In step S308, the application 102 associates the printer information acquired in step S305 and the device token acquired in step S307 with each other, and transmits the printer information and the device token associated with each other to the management server 400. Furthermore, the application 102 is assumed to preliminarily retain information for accessing the management server 400 (for example, address information about the management server 400).

In step S309, the management server 400 creates information for performing push notification (hereinafter also referred to as "push notification information"). Creation of the push notification information is performed based on an instruction received from a service provider via a dashboard which is provided by the management server 400. The dashboard is a management screen used for the service provider to set when and what push notification to perform to which terminal. The service provider uses a user interface (UI) screen which is provided by the dashboard, thus becoming able to set various settings concerning push notification. An example of the UI screen which is used for setting of a push notification is separately described below with reference to FIG. 4.

In step S310, the management server 400 transmits the push notification information created in step S309 to the push notification server 300. At this time, the management server 400 transmits, to the push notification server 300, a device token transmitted from a terminal serving as a delivery target for push notification while associating the device token with the push notification information. The push notification server 300 determines to which terminal to transmit a push notification serving as a target, based on the device token transmitted from the management server 400.

In step S311, the push notification server 300 delivers a push notification to the OS 101 installed on a terminal serving as a target. The push notification includes, for example, information for identifying an expiration date and a display condition, which are described below with reference to FIG. 5.

In step S312, upon receiving the push notification delivered from the push notification server 300, the OS 101 starts up the application 102 serving as a target. At this time, the application 102 can be configured to be started up in the background, and, in this case, screen displaying of the application 102 is not performed. Moreover, the OS 101 passes the received push notification information to the application 102.

In step S313, the application 102 stores the push notification information passed from the OS 101 in a region in the storage unit 120 which is under the control of the application 102. The reference to the push notification information stored in this region is allowed to be performed only the application 102 serving as a target or a user who is using the application 102 serving as a target. With such a contrivance employed, in a case where the application 102 is currently installed on an execution environment for each account, presentation of push notification information to a user corresponding to the account concerned (for example, displaying of push notification information via a screen) is performed.

In step S314, the application 102 stores the push notification information passed from the OS 101 in a region in the storage unit 120 to which the printer driver 103 is able to refer (for example, a region to which all of the users are able to refer). Furthermore, in a case where the application 102 serving as a target is not currently installed in an execution environment for each account, the push notification information stored in the above-mentioned region in step S314 is referred to by other software such as the printer driver 103.

Then, in step S315, the application 102 performs determination processing concerning displaying of a push notification. Furthermore, the details of the determination processing are separately described below.

Next, an example of a management screen for a push notification according to the present exemplary embodiment is described with reference to FIG. 4. A management screen illustrated in FIG. 4 is a screen which the management server 400 provides to an operator (for example, a service provider). The service provider can perform various settings concerning push notification, for example, a setting about to which terminal to perform push notification of what campaign.

Specifically, the management screen illustrated in FIG. 4 includes setting areas 401 to 405 and a registration button 406.

The setting area 401 is a setting area for performing, in a case where the delivery of a push notification has been performed, presentation (for example, words) which is displayed on a terminal serving as a target or reception of an input concerning setting of the information. In the example illustrated in FIG. 4, with respect to the setting area 401, words "Why don't you download the application to get a discount coupon for ink!" are set.

The setting area 402 is a setting area for performing, in a case where the selection of a push notification has been performed by the user, presentation of a Uniform Resource Locator (URL) of a web page which is displayed via a browser or reception of an input concerning designation of the URL. In the example illustrated in FIG. 4, with respect to the setting area 402, a URL "https://www.microsoft.com/store/apps/myappid" is set. Thus, in this case, when the selection of a message displayed as a push notification has been performed by the user, an installation screen for the application 102 in Microsoft® Store is displayed.

The setting area 403 is a setting area for performing presentation of an expiration date of displaying of a push notification or reception of the designation of the expiration date. In the example illustrated in FIG. 4, with respect to the setting area 403, "Dec. 1, 2022, at 0:00" is set.

The setting area 404 is a setting area for performing presentation of a printer serving as a delivery target for a push notification or reception of the designation of the printer serving as a delivery target. In the setting area 404, a list of previously set candidates (printers) each for a delivery target for a push notification is presented, and, via additionally presented check boxes, the designation of a candidate serving as a delivery target for a push notification is received. In a case where a printer name included in the printer information transmitted in step S305 and a printer name checked in the setting area 404 coincide with each other, the management server 400 extracts, as a delivery target for a push notification, a device token associated with the printer serving as a target. In the example illustrated in FIG. 4, check boxes with which "AAA Printer" and "BBB printer" are associated are checked. Thus, in this case, device tokens acquired in a series of terminals respectively connected to "AAA Printer" and "BBB printer" are extracted as delivery targets for a push notification.

The setting area 405 is a setting area for performing presentation of a display condition for push notification or reception of the designation of the display condition for push notification. In a case where the printer 200 connected to a terminal satisfies a condition designated via the setting area 405, a push notification is displayed on the terminal. In the example illustrated in FIG. 4, "in a case where the user has not yet installed the application" and "at the time of occurrence of ink remaining amount low warning" are set as a display condition for push notification.

Furthermore, the display condition for push notification does not need to be designated with respect to the setting area 405. In this case, the delivered push notification is displayed without depending on, for example, the installation state of the application 102 or the state of the printer 200.

The registration button 406 is an input interface for receiving an instruction concerning registration of information regarding various settings designated via the setting area 401 to the setting area 405. When the registration button 406 is pressed, information concerning various settings designated via the setting area 401 to the setting area 405 is transmitted to the push notification server 300, and the setting concerning push notification is updated by the push notification server 300 based on the transmitted information.

For example, in the case of the example illustrated in FIG. 4, the setting is updated in such a manner that a notification of the words "Why don't you download the application to get a discount coupon for ink!" is delivered to a terminal to which the "AAA printer" or the BBB printer" is connected. Moreover, in the terminal, in a case where displaying of a delivered push notification has been performed at timing when printing has been performed by the connected printer and, then, the selection of the push notification has been performed by the user, an installation screen for the application 102 is displayed. Moreover, the above-mentioned push notification is discarded when "Dec. 1, 2022, at 0:00" has been exceeded, and becomes not displayed from then on.

Next, an example of a data structure of push notification information is described with reference to FIG. 5 with a focus on a case where the setting illustrated in FIG. 4 as an example has been applied. Furthermore, while, in the example illustrated in FIG. 5, push notification information is defined in the JavaScript Object Notation (JSON) format, the data format for defining push notification information is not necessarily limited. Thus, as long as the push notification server 300 is able to interpret push notification information according to a predetermined format, such a format is not particularly limited. As a specific example, push notification information can be defined by using a markup language such as Extensible Markup Language (XML).

In the example illustrated in FIG. 5, in the "message" key, words of a push notification designated via the setting area 401 are set as a value. In the "campaignURL" key, a URL designated via the setting area 402 is set as a value. In the "expireDate" key, an expiration date designated via the setting area 403 is set as a value. In the "devices" key, information indicating device tokens extracted while being associated with printer names designated via the setting area 404 (printer names checked in the check boxes thereof) is set as a value. Furthermore, in the example illustrated in FIG. 5, although the illustration of some portions is omitted, in the "devices" key, information indicating a series of device tokens associated with printers serving as targets (device tokens respectively acquired in a series of terminals serving as targets) is set as a value. In the "condition" key, information indicating a display condition for push notification designated via the setting area 405 is set as a value.

Specifically, with respect to the "condition" key, "NotInstallUser", which indicates "in a case where the user has not yet installed the application", and "Warning:InkLow", which indicates "at the time of occurrence of ink remaining amount low warning", are set. Furthermore, a condition corresponding to "at the time of occurrence of ink remaining amount low warning" in the example illustrated in FIG. 5 is equivalent to a condition concerning the remaining amount of a consumable.

Next, an example of display determination processing for push notification, which is illustrated as processing in step S315 in FIG. 3, is described with reference to FIG. 6.

In step S601, the application 102 performs processing concerning determination as to whether a push notification serving as a target is within an expiration date (hereinafter also referred to as "expiration date determination processing"). Then, in step S602, the application 102 determines whether the push notification is within the expiration date.

If, in step S602, it is determined that the push notification is not within the expiration date (in other words, if it is determined that the expiration date is exceeded) (NO in step S602), the application 102 advances the processing to step S611. In this case, in step S611, the application 102 deletes push notification information serving as a target, and then ends a series of processing operations illustrated in FIG. 6.

On the other hand, if, in step S602, it is determined that the push notification is within the expiration date (YES in step S602), the application 102 advances the processing to step S603.

Here, an example of expiration date determination processing for push notification, which is illustrated as processing in step S601 in FIG. 6, is described with reference to FIG. 7.

In step S701, the application 102 reads out push notification information serving as a target from a region in the storage unit 120 which is under the control of the application 102.

In step S702, the application 102 determines whether an expiration date is currently designated with respect to the push notification information read out in step S701. Specifically, the application 102 determines whether there is a designation of an expiration date by the "expireDate" key with respect to the push notification information. Thus, in a case where the "expireDate" key is designated and a value is designated in the "expireDate" key, it is determined that an expiration date is currently designated.

If, in step S702, it is determined that an expiration date is not currently designated with respect to the push notification information (NO in step S702), the application 102 advances the processing to step S706. In this case, in step S706, the application 102 determines that the push notification is within the expiration date, and then ends a series of processing operations illustrated in FIG. 7.

On the other hand, if, in step S702, it is determined that an expiration date is currently designated with respect to the push notification information (YES in step S702), the application 102 advances the processing to step S703.

In step S703, the application 102 acquires information indicating the current date and time with use of a function which the OS 101 provides.

In step S704, the application 102 compares the expiration date designated in the push notification information and the current date and time indicated by the information acquired in step S703 with each other to determine whether the current date and time is within the expiration date for push notification.

If, in step S704, it is determined that the current date and time is within the expiration date for push notification (YES in step S704), the application 102 advances the processing to step S706. In this case, in step S706, the application 102 determines that the push notification is within the expiration date, and then ends a series of processing operations illustrated in FIG. 7.

On the other hand, if, in step S704, it is determined that the current date and time is not within the expiration date for push notification (NO in step S704), the application 102 advances the processing to step S705. In this case, in step S705, the application 102 determines that the expiration date for push notification is exceeded, and then ends a series of processing operations illustrated in FIG. 7.

Here, referring back to FIG. 6, processing operations in step S603 and subsequent steps are described.

In step S603, the application 102 performs communication with the printer 200 serving as a target via the communication unit 160, thus transmitting, to the printer 200, a request for acquiring status information and error/warning information from the printer 200.

The status information is information indicating in what state the device serving as a target is. For example, FIG. 8A illustrates an example of status information in a case where the device serving as a target is a printer. As a specific example, in a case where the printer 200 is in the process of printing, a value "Printing" indicating printing being in process as status information is transmitted as a reply from the printer 200.

Moreover, the error/warning information is information indicating an error or warning which is occurring in the device serving as a target. For example, FIG. 8B illustrates an example of error/warning information in a case where the device serving as a target is a printer. As a specific example, in a case where the printer 200 is in a state in which the remaining amount of ink is lower than a prescribed value, an ink remaining amount low warning indicating such a state occurs and a value "Warning:InkLow" indicating the ink remaining amount low warning as error/warning information is transmitted as a reply from the printer 200.

In step S604, the application 102 determines whether the acquisition of at least one of status information and error/warning information from the printer 200 is successful.

If, in step S604, it is determined that the acquisition of at least one of status information and error/warning information is successful (YES in step S604), the application 102 advances the processing to step S605. In this case, in step S605, the application 102 stores the acquired information (status information and/or error/warning information) in the storage unit 120.

On the other hand, if, in step S604, it is determined that the acquisition of at least one of status information and error/warning information is unsuccessful (NO in step S604), the application 102 advances the processing to step S606. In this case, processing in step S605 is skipped.

In step S606, the application 102 performs processing concerning determination as to whether it is possible to display a push notification (hereinafter also referred to as "display possibility or impossibility determination processing").

Here, an example of display possibility or impossibility determination processing for push notification, which is illustrated as processing in step S606 in FIG. 6, is described with reference to FIG. 9.

In step S901, the application 102 reads out push notification information from a region in the storage unit 120 which is under the control of the application 102.

In step S902, the application 102 determines whether there is a description of a display condition for push notification in the push notification information read out in step S901. As a specific example, in a case where there is a designation of the "condition" key in the push notification information and a value is designated in the "condition" key, the application 102 can determine that there is a description of a display condition for push notification.

If, in step S902, it is determined that there is no description of a display condition for push notification in the push notification information (NO in step S902), the application 102 advances the processing to step S906. In this case, in step S906, the application 102 determines that it is possible to display a push notification, and then ends a series of processing operations illustrated in FIG. 9.

On the other hand, if, in step S902, it is determined that there is a description of a display condition for push notification in the push notification information (YES in step S902), the application 102 advances the processing to step S903.

In step S903, the application 102 determines whether at least one of status information and error/warning information is currently stored in the storage unit 120.

If, in step S903, it is determined that neither of status information and error/warning information is currently stored in the storage unit 120 (NO in step S903), the application 102 advances the processing to step S907. In this case, since, due to neither of status information and error/warning information being stored, it is difficult to determine possibility or impossibility of displaying of a push notification, then in step S907, the application 102 determines that it is impossible to display a push notification, and then ends a series of processing operations illustrated in FIG. 9.

On the other hand, if, in step S903, it is determined that at least one of status information and error/warning information is currently stored in the storage unit 120 (YES in step S903), the application 102 advances the processing to step S904. In this case, in step S904, the application 102 reads out the information stored in the storage unit 120 (status information and/or error/warning information).

In step S905, the application 102 determines whether a content indicated by a value designated in the "condition" key of the push notification information coincides with a content indicated by the status information and/or error/warning information read out in step S904.

For example, in the case of the example illustrated in FIG. 5, with respect to the "condition" key, values "NotInstallUser" and "Warning:InkLow" are designated. In this case, the application 102 determines that the push notification serving as a target is directed to an account with which the application 102 has not yet been installed. Therefore, since, even if "ink remaining amount low warning" is included in the error/warning information, the application 102 is currently installed, the application 102 determines that the content indicated by the push notification information and the content indicated by the status information and/or error/warning information do not coincide with each other. Furthermore, not only in a case where, as in the example illustrated in FIG. 5, when the content indicated by the status information and/or error/warning information coincides with a plurality of display conditions, it is determined that it is possible to display the push notification, but also when the content indicated by the status information and/or error/warning information coincides with any one of a plurality of display conditions, it can be determined that it is possible to display the push notification.

If, in step S905, it is determined that the content indicated by the push notification information coincides with the content indicated by the status information and/or error/warning information (YES in step S905), the application 102 advances the processing to step S906. In this case, in step S906, the application 102 determines that it is possible to display the push notification, and then ends a series of processing operations illustrated in FIG. 9.

On the other hand, if, in step S905, it is determined that the content indicated by the push notification information does not coincide with the content indicated by the status information and/or error/warning information (NO in step S905), the application 102 advances the processing to step S907. In this case, in step S907, the application 102 determines that it is impossible to display the push notification, and then ends a series of processing operations illustrated in FIG. 9.

Figure 9:
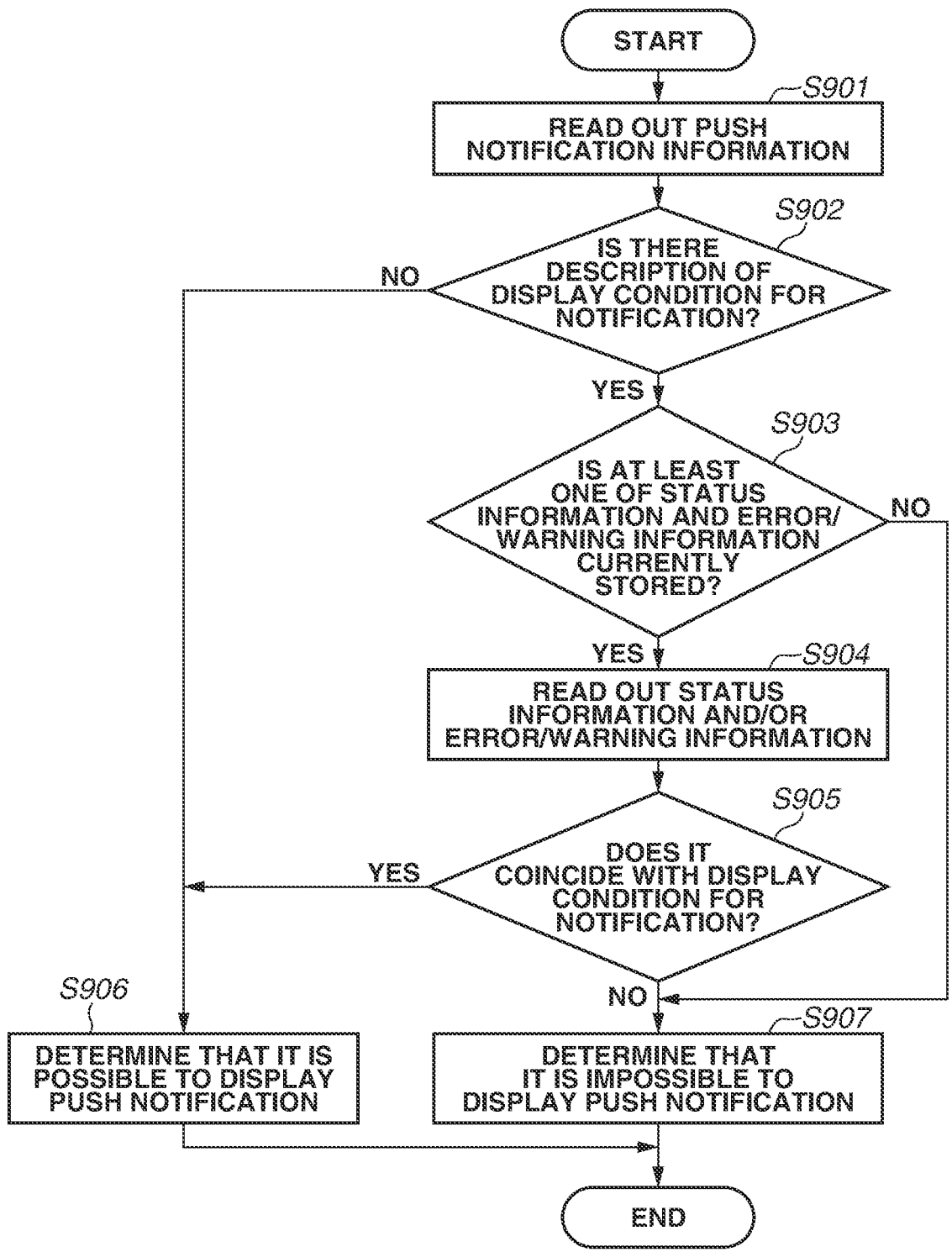
FIG. 9 is a flowchart illustrating an example of processing which is performed by the application.

Furthermore, at the time of ending a series of processing operations illustrated in FIG. 9, the application 102 stores information indicating a determination result in processing in step S906 or step S907 in a region in the storage unit 120 which is under the control of the application 102. Moreover, in the example described above with reference to FIG. 9, the information indicated by a push notification is equivalent to an example of notification information serving as a notification target, and the presence or absence of a display condition for the push notification or a condition designated as the display condition is equivalent to an example of a notification condition for the notification information. Moreover, display possibility or impossibility determination processing for a push notification which is performed by the application 102 is equivalent to an example of second determination processing for determining whether a notification condition for notification information serving as a notification target is satisfied.

Here, referring back to FIG. 6, processing in step S607 and subsequent steps is described.

In step S607, the application 102 reads out information indicating a result of processing in step S606 (i.e., a result of display possibility or impossibility determination processing for a push notification) from the storage unit 120, and, based on the read-out information, determines whether it is possible to display the push notification.

If, in step S607, it is determined that it is possible to display the push notification (YES in step S607), the application 102 advances the processing to step S608. In this case, in step S608, the application 102 causes the display unit 150 of the terminal device 100 to display the push notification. Moreover, at this time, the application 102 can cause the audio output unit 130 to perform audio output. Furthermore, processing concerning displaying of a push notification by the application 102 is equivalent to an example of second notification control processing.

After that, in step S611, the application 102 deletes push notification information corresponding to the push notification serving as a display target from a region in the storage unit 120 which is under the control of the application 102, and then ends a series of processing operations illustrated in FIG. 6.

On the other hand, if, in step S607, it is determined that it is impossible to display the push notification (NO in step S607), the application 102 advances the processing to step S609. In this case, in step S609, the application 102 starts up a timer and, in step S610, waits until a predetermined time elapses. Then, if, in step S610, it is determined that the predetermined time has elapsed (YES in step S610), the application 102 returns the processing to step S601. In this case, processing in step S601 and subsequent steps is performed again. With this processing, for example, in a case where, with the passing of time, status information or error/warning information has changed in such a way as to coincide with a display condition for a push notification, it becomes possible to cause a push notification to be displayed again.

Since the above-described control being applied enables notification information corresponding to a status of the printer 200 to be displayed, it becomes possible to issue a notification about notification information more attracting the user's interest.

Figure 10:
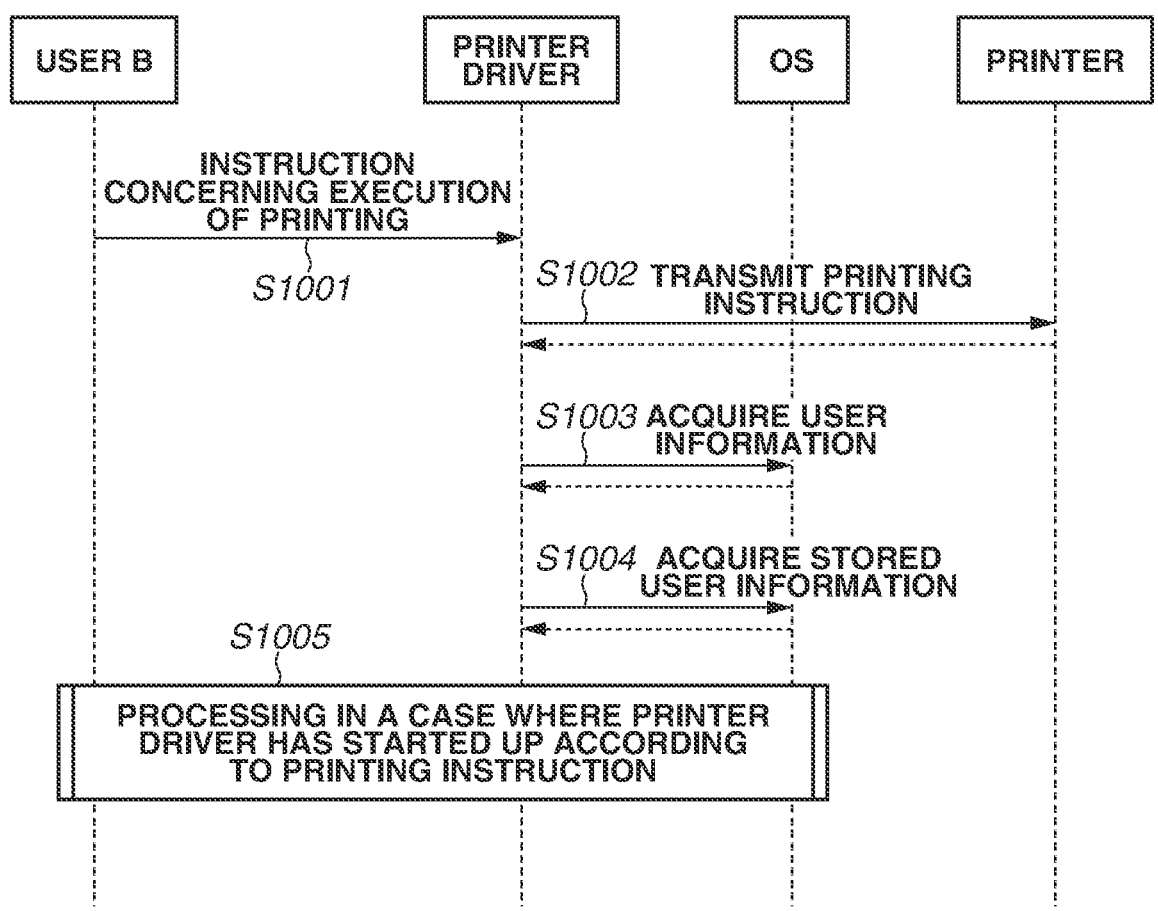
FIG. 10 is a sequence diagram illustrating an example of processing which is performed by the information processing system.

Next, as an example of processing which is performed by the information processing system according to the present exemplary embodiment, an example of processing in a case where the application 102 is not currently installed in an execution environment of an account serving as a target is described with reference to FIG. 10. In the example illustrated in FIG. 10, it is assumed that, while the printer driver 103 is currently installed in common with respect to all of the users who use the terminal device 100, the application 102 is assumed to be currently installed only in an execution environment corresponding to an account of the user A. In a case where, under the above-mentioned situation, another user B different from the user A uses the printer 200 via the printer driver 103, a series of processing operations illustrated in FIG. 10 is performed.

In step S1001, the printer driver 103 receives an instruction concerning execution of printing from the user B.

In step S1002, the printer driver 103 transmits a printing instruction corresponding to the instruction received in step S1001 to a printer serving as a target. Here, the printer 200 is assumed to be the printer serving as a target for the printing instruction.

In step S1003, with use of a function which the OS 101 provides, the printer driver 103 acquires user information corresponding to the user B, from which the instruction concerning execution of printing has been received in step S1001. The user information includes, for example, an account name associated with the user B.

In step S1004, the printer driver 103 acquires user information stored, in step S304 illustrated in FIG. 3, in a region in the storage unit 120 to which the printer driver 103 is able to refer. The user information includes an account name of the user who installed the application 102. Thus, in the example illustrated in FIG. 10, the user information includes an account name of the user A.

In step S1005, based on the user information acquired in step S1003 and the user information acquired in step S1004, the printer driver 103 performs processing in a case where the printer driver 103 has started up according to a printing instruction, which is described below with reference to FIG. 11.

Next, an example of processing to be performed by the printer driver 103 in a case where the printer driver 103 has started up according to a printing instruction, which is illustrated as processing in step S1005 in FIG. 10, is described with reference to FIG. 11.

In step S1101, the printer driver 103 performs communication with the printer 200 via the communication unit 160 and thus transmits, to the printer 200, a request for acquiring status information and error/warning information from the printer 200.

In step S1102, the printer driver 103 determines whether the acquisition of at least one of status information and error/warning information from the printer 200 performed based on the request transmitted to the printer 200 in step S1101 is successful.

If, in step S1102, it is determined that the acquisition of at least one of status information and error/warning information is successful (YES in step S1102), the printer driver 103 advances the processing to step S1103. In this case, in step S1103, the printer driver 103 stores information previously acquired from the printer 200 (status information and error/warning information) in the storage unit 120.

On the other hand, if, in step S1102, it is determined that the acquisition of both status information and error/warning information are unsuccessful (NO in step S1102), the printer driver 103 advances the processing to step S1104. In this case, processing in step S1103 is skipped.

In step S1104, the printer driver 103 causes the display unit 150 to display information according to a result of acquisition of status information and error/warning information.

Figure 12:
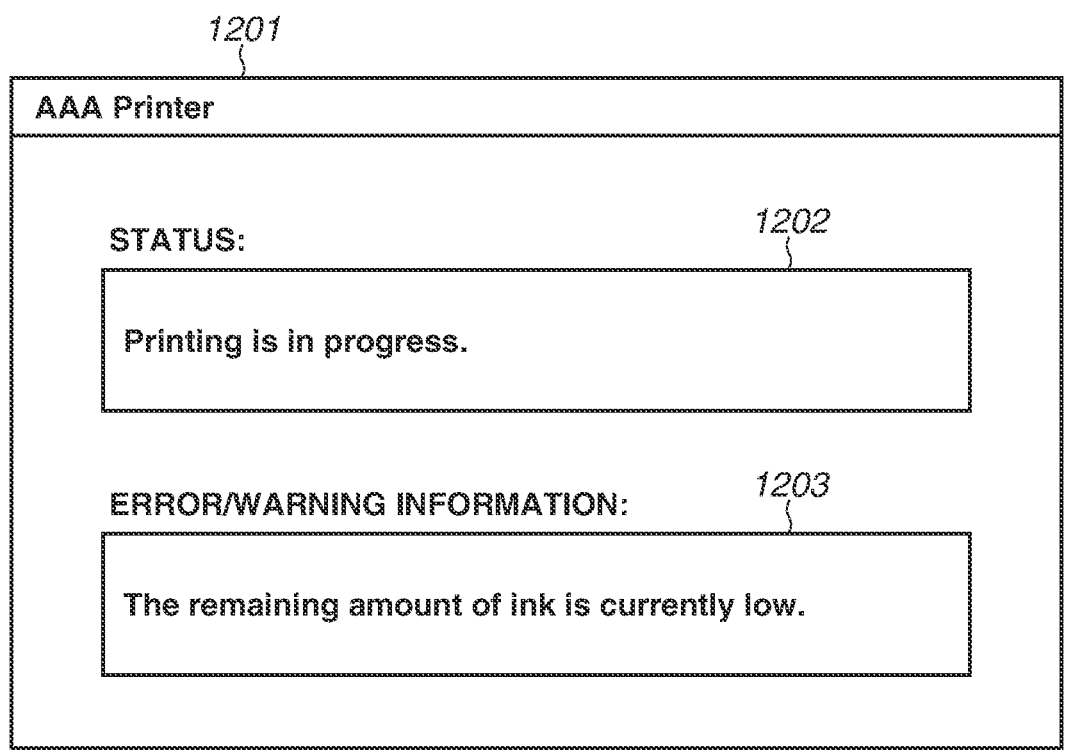
FIG. 12 is a diagram illustrating an example of a display screen for status information and error/warning information.

At this time, in a case where, in step S1102, the acquisition of at least one of status information and error/warning information is successful, the printer driver 103 causes the display unit 150 to display the above-mentioned information, as illustrated in FIG. 12 as an example. Furthermore, with regard to an example of a screen illustrated in FIG. 12, the details thereof are separately described below.

Figure 13:
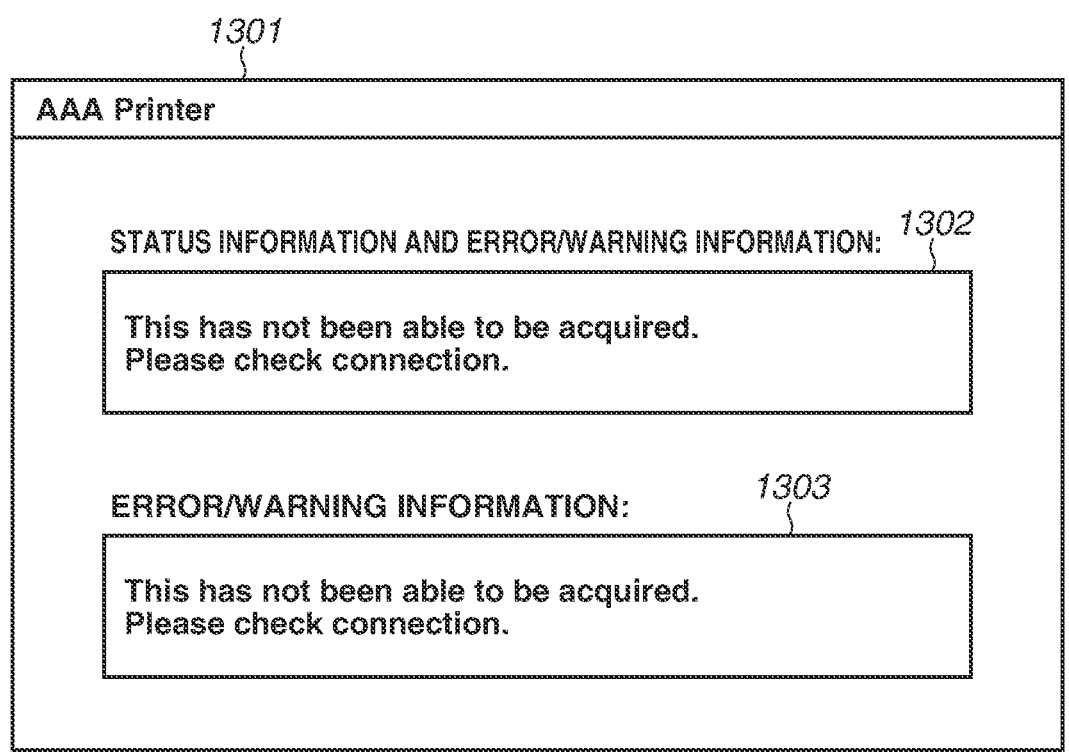
FIG. 13 is a diagram illustrating an example of a display screen for status information and error/warning information.

Moreover, in a case where, in step S1102, the acquisition of both status information and error/warning information is unsuccessful, the printer driver 103 causes the display unit 150 to display notification information indicating that the information was not able to be acquired, as illustrated in FIG. 13 as an example. Furthermore, with regard to an example of a screen illustrated in FIG. 13, the details thereof are also separately described below.

In step S1105, the printer driver 103 determines whether the user who is using the terminal device 100 (i.e., the user who has issued a printing instruction) has preliminarily installed the application 102, based on the user information acquired in step S1003 and the user information acquired in step S1004.

Figure 11:
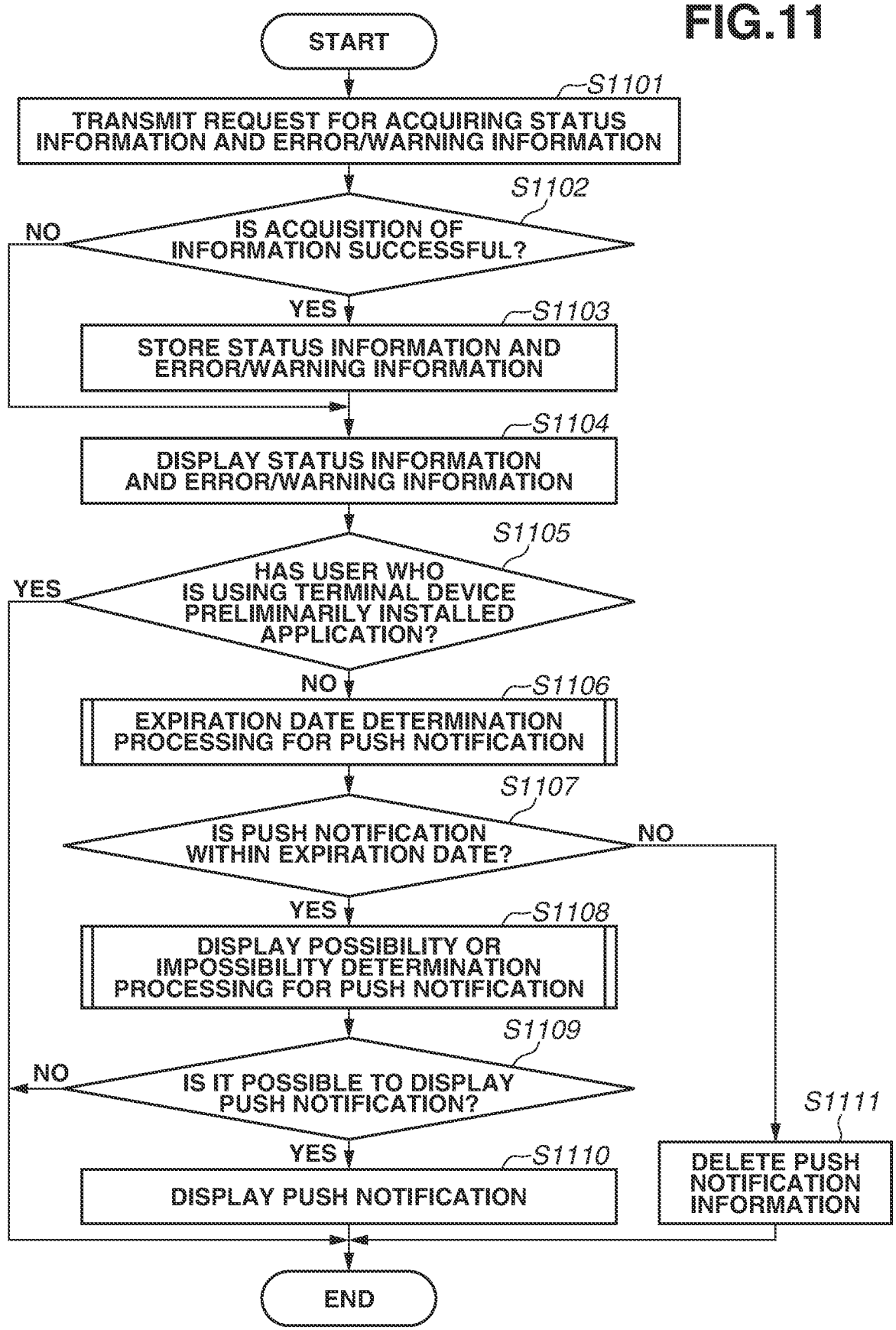
FIG. 11 is a flowchart illustrating an example of processing which is performed by a printer driver.

If, in step S1105, it is determined that the user who is using the terminal device 100 has preliminarily installed the application 102 (YES in step S1105), the printer driver 103 ends a series of processing operations illustrated in FIG. 11.

On the other hand, if, in step S1105, it is determined that the user who is using the terminal device 100 has not yet installed the application 102 (NO in step S1105), the printer driver 103 advances the processing to step S1106. In this case, in step S1106, the printer driver 103 performs expiration date determination processing for push notification. Furthermore, the expiration date determination processing for push notification, which is performed in step S1106, is substantially similar to the processing which is performed by the application 102 described above with reference to FIG. 7 and, therefore, the detailed description thereof is omitted.

In step S1107, the printer driver 103 determines whether the push notification is within the expiration date.

If, in step S1107, it is determined that the push notification is not within the expiration date (i.e., it is determined that the push notification has exceeded the expiration date) (NO in step S1107), the printer driver 103 advances the processing to step S1111. In this case, in step S1111, the printer driver 103 deletes the push notification information serving as a target stored in a region to which the printer driver 103 is able to refer, and then ends a series of processing operations illustrated in FIG. 11.

On the other hand, if, in step S1107, it is determined that the push notification is within the expiration date (YES in step S1107), the printer driver 103 advances the processing to step S1108. In this case, in step S1108, the printer driver 103 performs display possibility or impossibility determination processing for push notification. Furthermore, the display possibility or impossibility determination processing for push notification, which is performed in step S1108, is substantially similar to the processing which is performed by the application 102 described above with reference to FIG. 9 and, therefore, the detailed description thereof is omitted.

Moreover, the display possibility or impossibility determination processing which is performed by the printer driver 103 is equivalent to an example of first determination processing for determining whether a notification condition for notification information serving as a notification target is satisfied.

In step S1109, the printer driver 103 reads out information indicating a result of processing in step S1108 (i.e., a result of display possibility or impossibility determination processing) from the storage unit 120 and determines whether it is possible to display a push notification based on the read-out information.

If, in step S1109, it is determined that it is possible to display a push notification (YES in step S1109), the printer driver 103 advances the processing to step S1110. In this case, in step S1110, the printer driver 103 causes the display unit 150 of the terminal device 100 to display the push notification. Moreover, at this time, the printer driver 103 can cause the audio output unit 130 to perform audio output. On the other hand, if, in step S1109, it is determined that it is impossible to display a push notification (NO in step S1109), the printer driver 103 ends a series of processing operations illustrated in FIG. 11.

Furthermore, even in a case where the printer driver 103 causes the display unit 150 to display a push notification based on push notification information stored in a region to which the printer driver 103 is able to refer, the printer driver 103 also does not delete the push notification information and ends a series of processing operations illustrated in FIG. 11. This is because there is a possibility that the push notification information stored in a region to which the printer driver 103 is able to refer (i.e., a region to which all of the users are able to refer) is separately referred to for a push notification to another user as long as the push notification is within the expiration date.

moreover, processing concerning displaying of a push notification by the printer driver 103 is equivalent to an example of first notification control processing.

Next, an example of a screen used for the printer driver 103 to cause the display unit 150 to display status information and error/warning information about the printer 200 is described with reference to FIG. 12. The screen illustrated in FIG. 12 includes display areas 1201 to 1203.

The display area 1201 is a display area for displaying the model name of a printer 200 serving as a target. In the example illustrated in FIG. 12, in the display area 1201, "AAA Printer" is displayed as the model name, so that it is understandable that the printer 200 indicated by such a model name is the target of processing.

The display area 1202 is a display area in which the status information acquired from the printer 200 is displayed. In the example illustrated in FIG. 12, in the display area 1202, a message "Printing is in progress.", which indicates that the printer 200 is performing printing, is displayed. From this one, in the example illustrated in FIG. 12, it is understandable that, as status information, a value "Printing", which is illustrated in FIG. 8A as an example, has been transmitted as a reply.

The display area 1203 is a display area in which error/warning information acquired from the printer 200 is displayed. In the example illustrated in FIG. 12, in the display area 1203, a message "The remaining amount of ink is currently low.", which indicates that the remaining amount of ink is currently low, is displayed. From this one, in the example illustrated in FIG. 12, it is understandable that, as error/warning information, a value "Warning:InkLow", which is illustrated in FIG. 8B as an example, has been transmitted as a reply.

Next, an example of a screen which is displayed in a case where the printer driver 103 has failed in acquiring status information and error/warning information from the printer 200 is described with reference to FIG. 13. The screen illustrated in FIG. 13 includes display areas 1301 to 1303. The display areas 1301 to 1303 correspond to the display areas 1201 to 1203 illustrated in FIG. 12, respectively. On the other hand, in the example illustrated in FIG. 13, the printer driver 103 has failed in acquiring status information and error/warning information from the printer 200. Therefore, in each of the display areas 1302 and 1303, a message "This has not been able to be acquired. Please check connection.", which indicates that information serving as a target (status information and error/warning information) has not been able to be acquired, is displayed.

Furthermore, while, in the present exemplary embodiment, various descriptions have been performed with a focus on a case where the display condition for push notification is "at the time of occurrence of ink remaining amount low warning", this should not be construed to limit the display condition for push notification.

Thus, the display condition for push notification can be changed as appropriate according to a usage scene or a use case. As a specific example, in the case of issuing a push notification concerning a discount campaign for paper, "at the time of occurrence of paper remaining amount low warning" can be set as a display condition for the push notification. Moreover, as another example, in the case of issuing a push notification concerning a purchasing suggestion for a consumable such as a battery, "at the time of occurrence of battery failure error" can be set as a display condition for the push notification. Moreover, as a further example, in the case of issuing a push notification concerning a suggestion for a service relating to printing, the status being "printing in progress" can be set as a display condition for the push notification.

Moreover, while the above description has been performed with a focus on a case where the device which is mainly used via the terminal device 100 is a printer, the device serving as a target is not necessarily limited to a printer, and a driver which is used according to the type of the device can also be changed as appropriate. As a specific example, a scanner or a facsimile (FAX) apparatus can be applied as the device serving as a target, and, in that case, a scanner driver or a FAX driver can be applied as software which is equivalent to the printer driver 103 cooperating with the application 102.

Moreover, as a case where standard printing which the OS 101 provides is used, a case where various devices such as printers are used with use of a function included in the OS 101 itself is also assumable. In that case, an extended application for extending the function which the OS 101 provides can be provided to cause the extended application to implement processing equivalent to the printer driver 103 (for example, processing described above with reference to FIG. 11).

As described above, in the information processing system according to the present exemplary embodiment, a display condition for push notification is set by a service provider via a management screen illustrated in FIG. 4, so that displaying of a push notification is controlled according to the display condition. Moreover, push notification information for push notification is stored in a region to which a driver for the device serving as a target (for example, the printer driver 103) is able to refer. With such a configuration employed, even in a case where a user who has not yet installed an application 102 for implementing push notification in an execution environment has used the device serving as a target, it becomes possible to cause the driver for the device to perform push notification. Moreover, at this time, an advantageous effect of guiding a user who has not yet installed the application 102 to install the application 102 can be expected.

Modification Example

A modification example of an information processing system according to the present exemplary embodiment is described as follows. In the above-described exemplary embodiment, since, as a display condition for push notification, a condition "in a case where the user has not yet installed the application" is set, a user who has not yet installed the application 102 is a notification target for notification information. In the present modification example, an example of a case where, when notification of information directed to all of the users is performed irrespective of an installation situation of the application 102, in the case of an account with which the application 102 is not yet installed, a notification of a suggestion for installation is issued in addition to the notification of information is described. Furthermore, the present modification example is described with a focus on portions different from those in the above-described exemplary embodiment, and portions substantially similar to those in the above-described exemplary embodiment are omitted from detailed description.

First, an example of a management screen for performing setting of a push notification directed to all of the users is described with reference to FIG. 14. The management screen illustrated in FIG. 14 includes setting areas 1401 to 1406 and a registration button 1407. The setting areas 1401 to 1405 and the registration button 1407 are equivalent to the setting areas 401 to 405 and the registration button 406 in the management screen described with reference to FIG. 4, respectively.

In the example illustrated in FIG. 14, in the setting area 1401, as words to be displayed on the terminal, "Today only! Printing paper is discounted 10%." is set. In the setting area 1402, as the URL of a web page which is displayed via a browser, "https://www.hogehogexxx.com/campaign/index-.html" is set.

Thus, in this case, when the selection of a message displayed as a push notification is performed by the user, the user is guided to a page in which detailed information is presented. In the setting area 1403, as a deadline for displaying a push notification, "Dec. 1, 2022, at 0:00" is set. Moreover, in the example illustrated in FIG. 14, the designation of a printer serving as a delivery target for push notification via the setting area 1404 and the designation of a display condition for push notification via the setting area 1405 are not performed.

The setting area 1406 is a setting area for receiving the designation of a degree of priority of a push notification. In the example illustrated in FIG. 14, with respect to the setting area 1406, a value "high", which indicates that the degree of priority of a push notification serving as a target is higher, is set.

Thus, in the example illustrated in FIG. 14, a notification of words "Today only! Printing paper is discounted 10%." is delivered to all of the terminals connected to the push notification server 300. Moreover, in each terminal, at timing when processing concerning acquisition of status information about a printer connected to the terminal has been performed, irrespective of the success or unsuccess of the acquisition of status information and irrespective of the presence or absence of installation of the application 102, the delivered push notification is displayed. In a case where the displayed push notification has been selected by the user, a page indicated by a URL associated with the displayed push notification is displayed via the browser. Moreover, the above-mentioned notification is discarded on "Dec. 1, 2022, at 0:00" and, from then on, becomes not displayed.

Next, an example of a management screen for performing setting of a push notification directed to a user who has not yet installed the application 102 is described with reference to FIG. 15. The management screen illustrated in FIG. 15 includes setting areas 1501 to 1506 and a registration button 1507. The setting areas 1501 to 1506 and the registration button 1507 are equivalent to the setting areas 1401 to 1406 and the registration button 1407 in the management screen described with reference to FIG. 14, respectively.

In the example illustrated in FIG. 15, in the setting area 1501, as words which are displayed on the terminal, "If you install the application, you can get a great deal of bargain information! Download it now!" is set. In the setting area 1502, as the URL of a web page which is displayed via the browser, "https://www.microsoft.com/store/apps/myappid" is set. In the setting area 1503, as a deadline for displaying the push notification, "Dec. 1, 2022, at 0:00" is set. The designation of a printer serving as a delivery target for the push notification via the setting area 1504 is assumed not to be performed. In the setting area 1505, as a display condition for push notification, "in a case where the user has not yet installed the application" and "in the case of displaying an installation guide for the application" are set. In the setting area 1506, as a degree of priority of a push notification, a value "low", which indicates that the degree of priority of a push notification serving as a target is lower, is set.

Thus, in the example illustrated in FIG. 15, a notification of words "If you install the application, you can get a great deal of bargain information! Download it now!" is delivered to all of the terminals connected to the push notification server 300. Then, in each terminal, with respect to an account in which the application 102 is not currently installed in the execution environment, at timing when it has been determined to display an installation guide for the application 102, the delivered push notification is displayed. Then, in a case where the push notification has been selected by the user, an installation screen for the application 102 in Microsoft® Store is displayed. Moreover, the above-mentioned push notification is discarded on "Dec. 1, 2022, at 0:00" and, from then on, becomes not displayed.

Next, an example of processing which is performed by the printer driver 103 in a case where the printer driver 103 has started up according to a printing instruction is described with reference to FIG. 16. Furthermore, processing in steps S1601 to S1605 is substantially similar to the processing in steps S1101 to S1105 illustrated in FIG. 11, and, therefore, the detailed description thereof is omitted.

If, in step S1605, it is determined that the user who is using the terminal device 100 has not yet installed the application 102 (NO in step S1605), the printer driver 103 advances the processing to step S1606.

In step S1606, the printer driver 103 determines push notification information serving as a processing target from among pieces of push notification information stored in a region in the storage unit 120 to which the printer driver 103 is able to refer. As a specific example, the printer driver 103 can determine, from among pieces of push notification information the degree of priority of which is higher, push notification information the delivered date and time of which is older as a processing target.

In step S1607, the printer driver 103 determines whether to display a notification concerning an installation guide for the application 102, based on the push notification information determined as a processing target in step S1606. As a specific example, the printer driver 103 checks whether a condition "in a case where the user has not yet installed the application" is currently designated as a display condition with respect to the push notification information, and, in a case where such a condition is currently designated, determines to display a notification of the installation guide. Moreover, in a case where the condition "in a case where the user has not yet installed the application" is not currently designated as a display condition with respect to the push notification information, the printer driver 103 determines not to display a notification of the installation guide.

If, in step S1607, it is determined to display a notification of the installation guide (YES in step S1607), the printer driver 103 advances the processing to step S1608. In this case, the printer driver 103 refers to the push notification information determined as a processing target in step S1606, and then in step S1608, refers to push notification information concerning the application guide for the application 102.

On the other hand, if, in step S1607, it is determined not to display a notification of the installation guide (NO in step S1607), the printer driver 103 advances the processing to step S1609. In this case, the printer driver 103 refers to the push notification information determined as a processing target in step S1606, and skips processing in step S1608.

Furthermore, processing in step S1609 and subsequent steps is substantially similar to the example described above with reference to FIG. 11, and, therefore, the detailed description thereof is omitted.

Focusing on the examples illustrated in FIG. 14 and FIG. 15, in a case where each piece of push notification information has been created by the management server 400, processing in step S314 illustrated in FIG. 3 causes the push notification information to be stored in a region to which the printer driver 103 is able to refer (for example, a region to which all of the users are able to refer).

Figure 16:
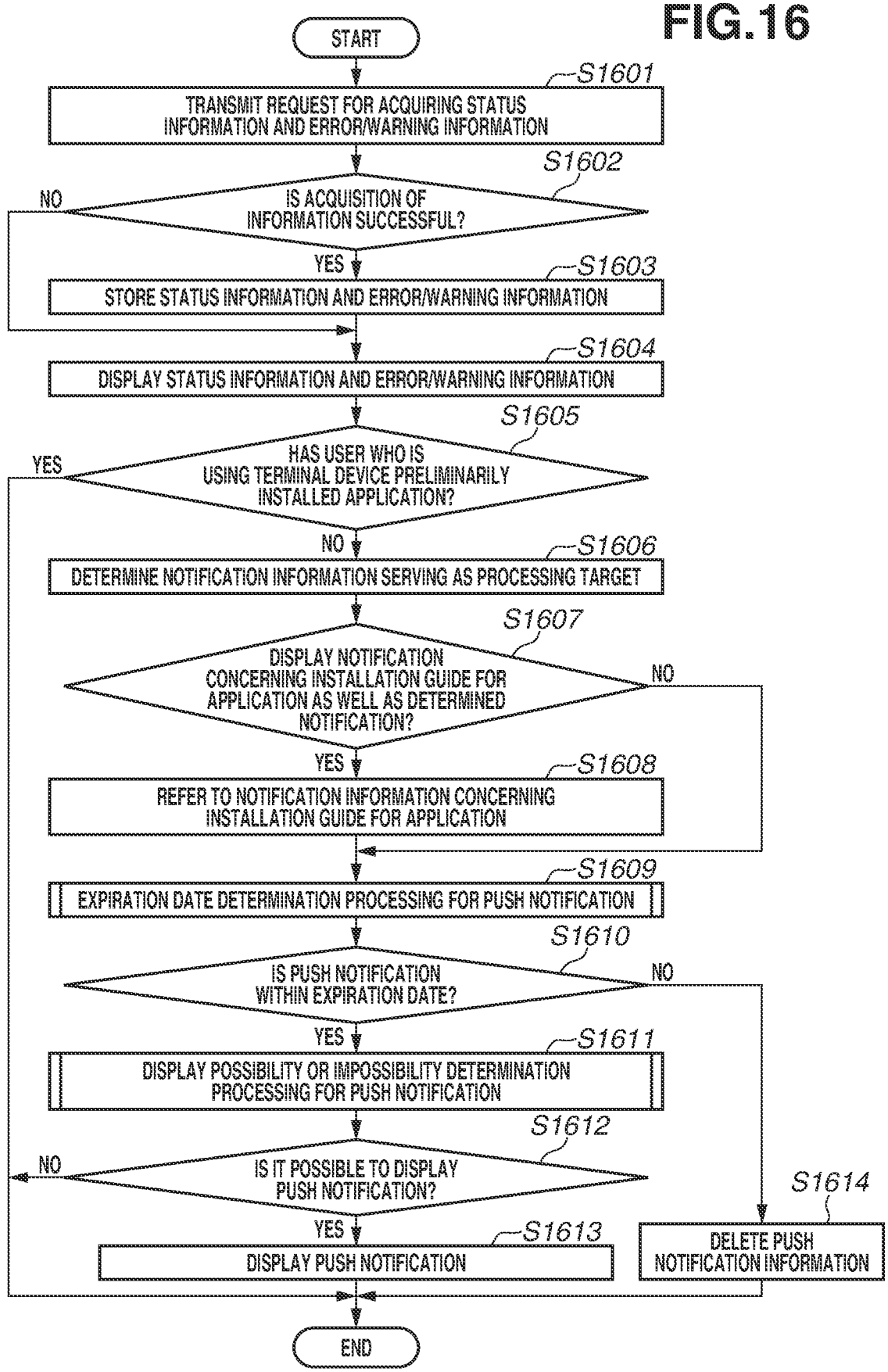
FIG. 16 is a flowchart illustrating an example of processing which is performed by the printer driver.

After that, when an instruction concerning execution of printing is issued from the user, in processing in step S1605 illustrated in FIG. 16, the printer driver 103 determines whether the user has preliminarily installed the application 102. If it is determined that the user serving as a target has not yet installed the application 102, the printer driver 103 refers to push notification information the degree of priority of which is higher from among pieces of push notification information stored in a region to which the printer driver 103 is able to refer. Here, push notification information corresponding to the example described above with reference to FIG. 14 is assumed to have been referred to.

Next, the printer driver 103 determines whether to display a notification concerning an installation screen for the application 102 as well as notification information determined as a processing target. In the example illustrated in FIG. 14, since a display condition for push notification is not currently designated, the printer driver 103 determines to display a push notification concerning an installation guide directed to a user who has not yet installed the application 102. In this case, the printer driver 103 refers to push notification information corresponding to the example illustrated in FIG. 15, in which a condition "in the case of displaying an installation guide for the application" is designated as a display condition for push notification. The printer driver 103 refers to two pieces of push notification information corresponding to the examples illustrated in FIG. 14 and FIG. 15, respectively, and performs processing similar to the processing performed in a case where the printer driver 103 has started up according to an instruction concerning execution of printing. Furthermore, with regard to the sequence order of displaying being performed, displaying of a push notification corresponding to the example illustrated in FIG. 14, in which the degree of priority is set higher, is performed in first, and subsequently, displaying of a push notification corresponding to the example illustrated in FIG. 15, in which the degree of priority is set lower, is performed.

As described above, in the information processing system according to the present modification example, even in a case where a push notification directed to a series of users serving as targets is issued, it becomes possible to present an installation guide directed to a user who has not yet installed the application 102.

The present disclosure can also be implemented by processing for supplying a program for implementing one or more functions of the above-described exemplary embodiment to a system or apparatus via a network or a storage medium and causing one or more processors included in a computer of the system or apparatus to read out and execute the program. In this case, the supplied program itself implements one or more functions of the above-described exemplary embodiment, and a storage medium having code of the program stored therein constitutes the present disclosure.

Examples of the storage medium for supplying program code include a flexible disk, a hard disk, an optical disc, a magneto-optical disc, a compact disc-read-only memory (CD-ROM), a compact disc recordable (CD-R), a magnetic tape, a non-volatile memory card, a read-only memory (ROM), and a digital versatile disc (DVD).

Moreover, the functions of the above-described exemplary embodiment can be implemented by the computer executing the read-out program code to cause, for example, an OS running on the computer to perform a part or the whole of actual processing based on instructions of the program code.

Moreover, the functions of the above-described exemplary embodiment can also be implemented by a circuit which implements one or more functions of the above-described exemplary embodiment (for example, an application specific integrated circuit (ASIC)).

For example, the functions of the above-described exemplary embodiment can also be implemented by a function expansion board inserted into a computer or a function expansion unit connected to a computer. In this case, for example, program code read out from a storage medium is written into a memory included in the function expansion board or the unction expansion unit. Then, the functions of the above-described exemplary embodiment can also be implemented by, for example, a CPU included in the function expansion board or the unction expansion unit performing a part or the whole of actual processing based on instructions of the program code.

Moreover, the disclosure of the present exemplary embodiment includes the following configurations, method, and storage medium.

(Configuration 1)

An information processing apparatus including a driver for a predetermined device, and an application configured to be installed, for each account for a target apparatus, in an execution environment of the account and to run while cooperating with the driver, wherein the application includes a storage unit configured to store notification information serving as a notification target in a region to which the driver is able to refer, and wherein the driver includes a first determination unit configured to determine whether the application is currently installed in an execution environment of a target account, a second determination unit configured to determine whether a notification condition for the notification information stored in the region is satisfied, and a first notification control unit configured to, in a case where it is determined by the first determination unit that the application is not currently installed in the execution environment of the target account and it is determined by the second determination unit that the notification condition for the notification information is satisfied, cause a predetermined notification unit to issue a notification indicating information based on the notification information.

(Configuration 2)

The information processing apparatus set forth in Configuration 1, wherein the application further includes a second notification control unit configured to cause a predetermined notification unit to issue a notification indicating information, and wherein, in a case where the application is currently installed in the execution environment of the target account, a notification indicating information that is based on the notification information is issued by the second notification control unit.

(Configuration 3)

The information processing apparatus set forth in Configuration 1 or 2, wherein the notification condition includes at least one of a condition concerning a remaining amount of a consumable which is used by the predetermined device, a condition concerning an error which occurs in the predetermined device, and a condition concerning a status of the predetermined device.

(Configuration 4)

The information processing apparatus set forth in any one of Configurations 1 to 3, wherein, in a case where it is determined by the first determination unit that the application is not currently installed in the execution environment of the target account, the first notification control unit causes a predetermined notification unit to issue a notification indicating information for prompting installation of the application.

(Configuration 5)

The information processing apparatus set forth in any one of Configurations 1 to 4, wherein the application receives the notification information from the predetermined device.

(Configuration 6)

The information processing apparatus set forth in any one of Configurations 1 to 5, wherein, in a case where the driver has received an instruction directed to the predetermined device, each of the first determination unit and the second determination unit performs processing related to a respective corresponding determination.

(Configuration 7)

The information processing apparatus set forth in Configuration 6, wherein the predetermined device is a printer, and wherein the instruction is an instruction related to printing directed to the printer.

(Method 1)

A control method for an information processing apparatus including a driver for a predetermined device, and an application configured to be installed, for each account of a target apparatus, in an execution environment of the account and to run while cooperating with the driver, the control method including storing notification information serving as a notification target in a region to which the driver is able to refer, determining whether the application is currently installed in an execution environment of a target account, determining whether a notification condition for the notification information stored in the region is satisfied, and, in a case where it is determined that the application is not currently installed in the execution environment of the target account and it is determined that the notification condition for the notification information is satisfied, causing a predetermined notification unit to issue a notification indicating information based on the notification information.

(Storage medium 1)

A non-transitory computer-readable storage medium storing a program capable of running while cooperating with an application configured to be installed, for each account of a target apparatus, in an execution environment of the account and to run, wherein the application includes a storage unit configured to store notification information serving as a notification target in a region to which a driver for a predetermined device is able to refer, the storage medium configured to cause a computer to function to perform first determination for determining whether the application is currently installed in an execution environment of a target account, perform second determination for determining whether a notification condition for the notification information stored in the region is satisfied, and, in a case where it is determined that the application is not currently installed in the execution environment of the target account and it is determined that the notification condition for the notification information is satisfied, cause a notification indicating predetermined information to be issued based on the notification information.

According to aspects of the present disclosure, even in a condition in which one information processing apparatus is used with a plurality of accounts, it is possible to issue a notification of information in a more favorable manner depending on a usage situation of a target application for each account.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-161665 filed Oct. 6, 2022, which is hereby incorporated by reference herein in its entirety.

What is claimed is:

1. An information processing apparatus comprising:
at least one processor; and
at least one memory, storing instructions, the at least one processor executing the instructions to function as the following:
a driver configured to instruct an image processing apparatus to execute image processing; and
an application different from the driver and configured to run while cooperating with the driver,
wherein the application includes:
a receiving unit configured to receive a notification information from a predetermined device;
a storage unit configured to store the notification information serving as a notification target in a region to which the driver is able to refer;
a determination unit configured to determine that there is a description for a notification condition in the notification information; and a setting unit configured to set the notification condition of the notification information based on the determined description for the notification condition; and wherein the driver includes:

an instruction unit configured to instruct the image processing apparatus to execute an image processing function; and a first notification control unit configured to, in a case where status information of the image processing apparatus acquired from the image processing apparatus by the information processing apparatus satisfies the notification condition set by the setting unit, perform processing for displaying a notification on a basis of the stored notification information.

2. The information processing apparatus according to claim 1, wherein the application further includes a second notification control unit configured to cause a predetermined notification unit to issue a notification indicating information, and wherein, in a case where the application is currently installed in an execution environment of a target account, a notification indicating information that is based on the notification information is issued by the second notification control unit.

3. The information processing apparatus according to claim 1, wherein the notification condition includes at least one of a condition concerning a remaining amount of a consumable which is used by the predetermined device, a condition concerning an error which occurs in the predetermined device, and a condition concerning a status of the predetermined device.

4. The information processing apparatus according to claim 1, wherein, in a case where it is determined by a first determination unit that the application is not currently installed in an execution environment of the target account, the first notification control unit causes a predetermined notification unit to issue a notification indicating information for prompting installation of the application.

5. The information processing apparatus according to claim 1, wherein, in a case where the driver has received an instruction directed to the predetermined device, each of a first determination unit and a second determination unit performs processing related to a respective corresponding determination.

6. The information processing apparatus according to claim 5, wherein the predetermined device is a printer, and wherein the instruction is an instruction related to printing directed to the printer.

7. The information processing apparatus according to claim 1, wherein, the driver further includes:

a first determination unit configured to determine whether the application is currently installed in an execution environment of a target account, and a second determination unit configured to determine whether a notification condition for the notification information stored in the region is satisfied, and wherein, in a case where it is determined by the first determination unit that the application is not currently installed in the execution environment of the target account and it is determined by the second determination unit that the notification condition for the notification information is satisfied, the first notification control unit performs the processing for displaying the notification.

8. The information processing apparatus according to claim 1, wherein the application performs processing for displaying a notification that is based on the notification information.

9. The information processing apparatus according to claim 1, wherein the application performs processing for displaying a setting screen for setting the notification condition for the notification information.

10. The information processing apparatus according to claim 1, wherein the application has a function of causing the image processing apparatus to execute the image processing function and a function of performing various kinds of notification.

11. A control method for an information processing apparatus including a driver configured to instruct an image processing apparatus to execute image processing, and an application different from the driver and configured to run while cooperating with the driver, the control method comprising:

receiving, by the application, notification information from a predetermined device;

storing, by the application, the notification information serving as a notification target in a region to which the driver is able to refer;

determine, by the application, that there is a description for a notification condition in the notification information;

setting, by the application, the notification condition of the notification information based on the determined description for the notification condition;

instructing, by the driver, the image processing apparatus to execute an image processing function; and performing, by the driver, in a case where status information of the image processing apparatus acquired from the image processing apparatus by the information processing apparatus satisfies the notification condition set, processing for displaying a notification on a basis of the stored notification information.

12. A non-transitory computer-readable storage medium storing a program when executed perform a control method of an information processing apparatus including a driver configured to instruct an image processing apparatus to execute image processing, and an application different from the driver and configured to run while cooperating with the driver, the control method comprising:

receiving, by the application, notification information from a predetermined device;

storing, by the application, the notification information serving as a notification target in a region to which the driver is able to refer;

determine, by the application, that there is a description for a notification condition in the notification information;

setting, by the application, the notification condition of the notification information based on the determined description for the notification condition;

instructing, by the driver, the image processing apparatus to execute an image processing function; and performing, by the driver, in a case where status information of the image processing apparatus acquired from the image processing apparatus by the information processing apparatus satisfies the notification condition set, processing for displaying a notification on a basis of the stored notification information.

13. The non-transitory computer-readable storage medium according to claim 12, wherein the application causes a predetermined notification indicating information to issue, and wherein, in a case where the application is currently installed in an execution environment of a target account, a notification indicating information that is based on the notification information is issued.

14. The non-transitory computer-readable storage medium according to claim 12, wherein the notification condition includes at least one of a condition concerning a remaining amount of a consumable which is used by the predetermined device, a condition concerning an error which occurs in the predetermined device, and a condition concerning a status of the predetermined device.

15. The non-transitory computer-readable storage medium according to claim 12, wherein, in a case where it is determined the application is not currently installed in an execution environment of a target account, the computer causes a predetermined notification indicating information for prompting installation of the application to issue.

16. The non-transitory computer-readable storage medium according to claim 12, wherein the predetermined device is a printer.

\* \* \* \* \*